US011366450B2

(12) United States Patent
Zhang et al.

(10) Patent No.: US 11,366,450 B2
(45) Date of Patent: Jun. 21, 2022

(54) ROBOT LOCALIZATION IN A WORKSPACE VIA DETECTION OF A DATUM

(71) Applicant: ABB Schweiz AG, Baden (CH)

(72) Inventors: Biao Zhang, West Hartford, CT (US); Jianjun Wang, West Hartford, CT (US); Remus Boca, Simsbury, CT (US)

(73) Assignee: ABB Schweiz AG, Baden (CH)

( * ) Notice: Subject to any disclaimer, the term of this patent is extended or adjusted under 35 U.S.C. 154(b) by 138 days.

(21) Appl. No.: 15/467,573

(22) Filed: Mar. 23, 2017

(65) Prior Publication Data
US 2018/0275632 A1  Sep. 27, 2018

(51) Int. Cl.
  *B25J 9/16*  (2006.01)
  *G05B 19/408*  (2006.01)
(52) U.S. Cl.
  CPC ........ *G05B 19/4086* (2013.01); *B25J 9/1692* (2013.01); *B25J 9/1697* (2013.01)
(58) Field of Classification Search
  CPC ............... B25J 9/1697; B25J 9/1692; B25J 19/021–025; G05B 19/4086; B05B 2219/39033; B05B 2219/40623; B05B 2219/39391; B05B 2219/39008; B05B 2219/39011; B05B 2219/40607; B05B 2219/40609
  See application file for complete search history.

(56) References Cited

U.S. PATENT DOCUMENTS

| 2010/0166294 A1 | 7/2010 | Marrion et al. |
| 2013/0023128 A1 | 1/2013 | Fujikura |
| 2016/0016312 A1 | 1/2016 | Lawrence, III et al. |
| 2016/0368148 A1 | 12/2016 | Payton et al. |

FOREIGN PATENT DOCUMENTS

| CN | 106426186 A | 2/2017 |
| CN | 106041937 B  * | 9/2018 ............... B25J 9/16 |
| WO | WO 2016/172718 A1 | 10/2016 |

OTHER PUBLICATIONS

Hebert, et al., "Combined Shape, Appearance and Silhouette for Simultaneous Manipulator and Object Tracking", May 2012, IEEE International Conference on Robotics and Automation, pp. 2405-2412 (Year: 2012).*

(Continued)

*Primary Examiner* — Spencer D Patton
(74) *Attorney, Agent, or Firm* — Leydig, Voit & Mayer, Ltd.

(57) ABSTRACT

Apparatus and method is disclosed for determining position of a robot relative to objects in a workspace which includes the use of a camera, scanner, or other suitable device in conjunction with object recognition. The camera, etc is used to receive information from which a point cloud can be developed about the scene that is viewed by the camera. The point cloud will be appreciated to be in a camera centric frame of reference. Information about a known datum is used and compared to the point cloud through object recognition. For example, a link from a robot could be the identified datum so that, when recognized, the coordinates of the point cloud can be converted to a robot centric frame of reference since the position of the datum would be known relative to the robot.

21 Claims, 4 Drawing Sheets

(56) References Cited

OTHER PUBLICATIONS

Nuchter, et al., "6D SLAM with Cached kd-tree Search", 2007, Dagstuhl Seminar Proceedings 06421 (Year: 2007).*
Klingensmith, et al., "Closed-loop Servoing using Real-time Markerless Arm Tracking", May 2013, Proceedings of International Conference on Robotics and Automation (Humanoids Workshop) (Year: 2013).*
International Search Report and Written Opinion, International Patent Application No. PCT/US2018/024070, dated Jun. 15, 2018, 10 pages.
European Patent Office, Extended European Search Report in European Patent Application No. 18770952.2, 19 pp. (dated Mar. 9, 2021).

* cited by examiner

ROBOT LOCALIZATION IN A WORKSPACE VIA DETECTION OF A DATUM

TECHNICAL FIELD

The present invention generally relates to situational awareness of robots, and more particularly, but not exclusively, to determining situation awareness through use of object recognition.

BACKGROUND

Providing situational awareness for robots as they navigate and/or manipulate their surroundings remains an area of interest. Some existing systems have various shortcomings relative to certain applications. Accordingly, there remains a need for further contributions in this area of technology.

SUMMARY

One embodiment of the present invention is a unique approach to determining situational awareness in the surroundings of a robot. Other embodiments include apparatuses, systems, devices, hardware, methods, and combinations for determining position of robots in a workspace. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
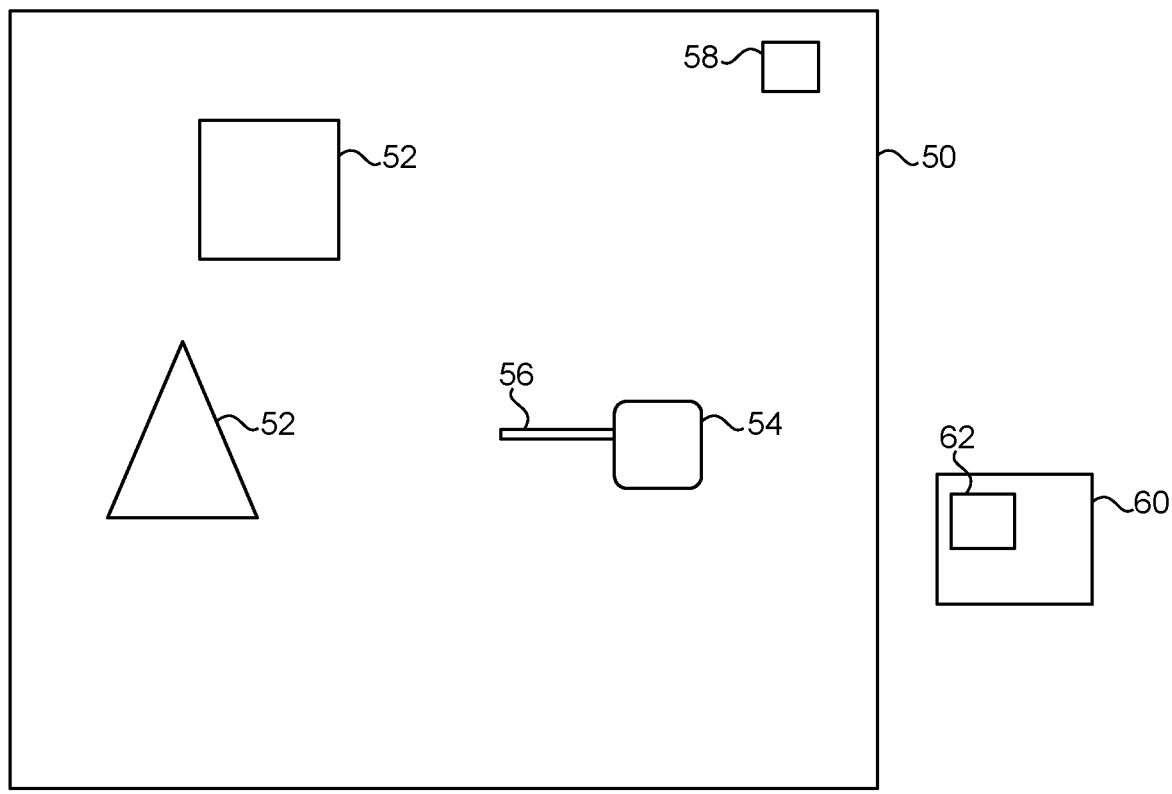
FIG. 1 depicts one embodiment of a robot in a workspace.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, a workspace 50 is disclosed which includes one or more workspace objects 52 distributed therein, and in which a robot 54 can also be disposed for operating upon the workspace object 52, or avoiding one or more features of the workspace object 52. The workspace 50 can be a cell, enclosed room, or local area (whether or not enclosed) in which the robot 54 can traverse and/or manipulate one or more effectors 56 such as an arm, hand, gripper, suction pad, etc. A position detector 58 is used to detect position of the workspace object 52 and robot 54 within the workspace 50, and is aided in doing so through the use of a computer 60 which can receive position related information taken by the position detector 58 and manipulate the robot 54 and/or effector 56. Further details are described below regarding the position detector 58 and computer implemented application to assist in determining relative positioning of the object(s) 52 to the robot 54 to aid in navigation/manipulation/etc tasks of the robot 54.

The robot 54 can be any useful device capable of maneuvering within the workspace. Such maneuvering can be by transporting from one location to another, by simply by moving one or more effectors 56 (e.g. an arm, gripper, slider, etc), or a combination of the two. The maneuvering can include any one or more of translation and rotation. In one form the robot 45 is a two armed robot having multiple degrees of freedom and capable of gripping or otherwise manipulating objects in the workspace 50 (e.g. the objects 52) and/or maneuvering around objects 52.

The position finder 58 can be based upon a camera, scanner, or similar device that is capable of capturing a signal useful for producing a point cloud representative of locations on an object of interest (e.g. object 52). The camera, scanner, or like device is used to capture any variety of signals such as electromagnetic radiation (e.g. visible light), sound, etc that is reflected or passes through an object (e.g. object 52 and/or robot 54). The position finder 58 can be hand held or retained through any mechanism, whether static or moving. The position finder 58 can be used in conjunction with a source that emits such signals (e.g. overhead lights, laser, x-ray machine, audible or non-audible speaker, etc etc) or utilize ambient reflected signals such as may occur through an object illuminated by sunlight. The detection/capture of such a signal can be used to determine the location of one or more aspects of an object of interest and can be accomplished through any number of devices such as a charge-coupled device, microphone, etc. Detecting the locations of various features permits the creation of a point cloud which can be referenced to an arbitrary coordinate system, usually defined relative to the position finder itself. Such a point cloud can be determined through use of the computer 60 as will be described further below.

A few nonlimiting examples of a position finders 58 include non-contact 3D scanners, non-contact passive scanners, stereoscopic systems, photometric scanners, silhouette scanners, 3-D cameras, moving 2-D cameras, etc. For ease of description, and to highlight just two possible position finders (any suitable for creation of point clouds are acceptable herein), reference will be made below to either "camera" or "scanner", though no limitation is hereby intended regarding the suitability of any other possible position finder 58 as suggested above in any of the disclosed embodiments. Thus, any mention of "camera" or "scanner" with respect to any specific embodiment will be appreciated to also apply to any of the other types of position finders 58 unless inherently or explicitly prohibited to the contrary.

As used herein, the term "position finder" can include a single sensor that receives a position information signal (e.g. reflected electromagnetic radiation, etc) and/or can include a larger system of sensors, lenses, housing, cabling, etc. No limitation is hereby intended that a "position finder" is limited to a single discrete component unless expressly intended to the contrary.

The position finder 58 can capture an "image" of the scene useful in determining the position of various features within the scene. Such an "image" can include any different data type associated with the various types of position finders. For example, the "image" can be a visible photo image of the scene, laser scan data, etc. in any of the possible data formats (.jpeg, .mpeg, .mov, etc). The data formats, or data derived from the formats, can be transformed into any format or data type useful to implement and/or perform the various embodiments described herein. The position data associated with the various features is any type of data useful to either directly express distance or infer distance with subsequent processing. For example, position data can be a visual scene captured by a camera and operated upon by subsequent algorithm of the computer 60 to determine position information.

The position information of each of the features is used by the computer 60 to formulate a point cloud associated with the various features, each point representing a feature or component of an object within the scene. The point cloud is used in later processing to determine relative positioning of objects in the scene, and to identify features of the scene through object recognition.

As suggested above, the camera 58 can be hand held, but other variations are also contemplated herein. In one non-limiting embodiment the camera 58 can be located on the robot 54, for example mounted in conjunction with a base of an arm, or any other suitable location. In other embodiments, however, the camera 58 can be located remote from the robot 54, such as but not limited to a wall of the workspace 50 in which the robot 54 is also located. In these embodiments the camera 58 can be located and mounted in such a fashion to permit viewing of the robot 54, or a portion of the robot 54, but such limitation may not be required given the description below of a datum useful in determining relative position information in the workspace 50.

One or more computing devices (e.g. computer 60) are used to gather the information from the camera 58 and create a point cloud of various features within the scene. The computing devices can include a computer based application 62 useful in gathering data and making the necessary computations discussed herein. The computer based application 62 can be hosted locally or in a remote location, or it can be a distributed application as will be appreciated. The computer based application 62 is generally structured to determine situational awareness within the workspace 50 in conjunction with developing actions of the effector 56. The computer based application 62 is structured to detect a position of the robot 54 within the workspace by utilizing information from the camera 58 as well as object recognition algorithms operated upon the information from the camera 58.

In one form the computer based application 62 can be considered as a controller, where use of the term "controller" herein includes those embodiments which express the complete control algorithms necessary to operate the robot, or sub-components that carry out discrete or limited tasks that, when taken together with other components, are useful to control the robot. Thus, the term "controller" may refer to the particular useful in determining position of the objects 52 when operating in conjunction with other portions that, in sum, act to control the robot 54.

Figure 2:
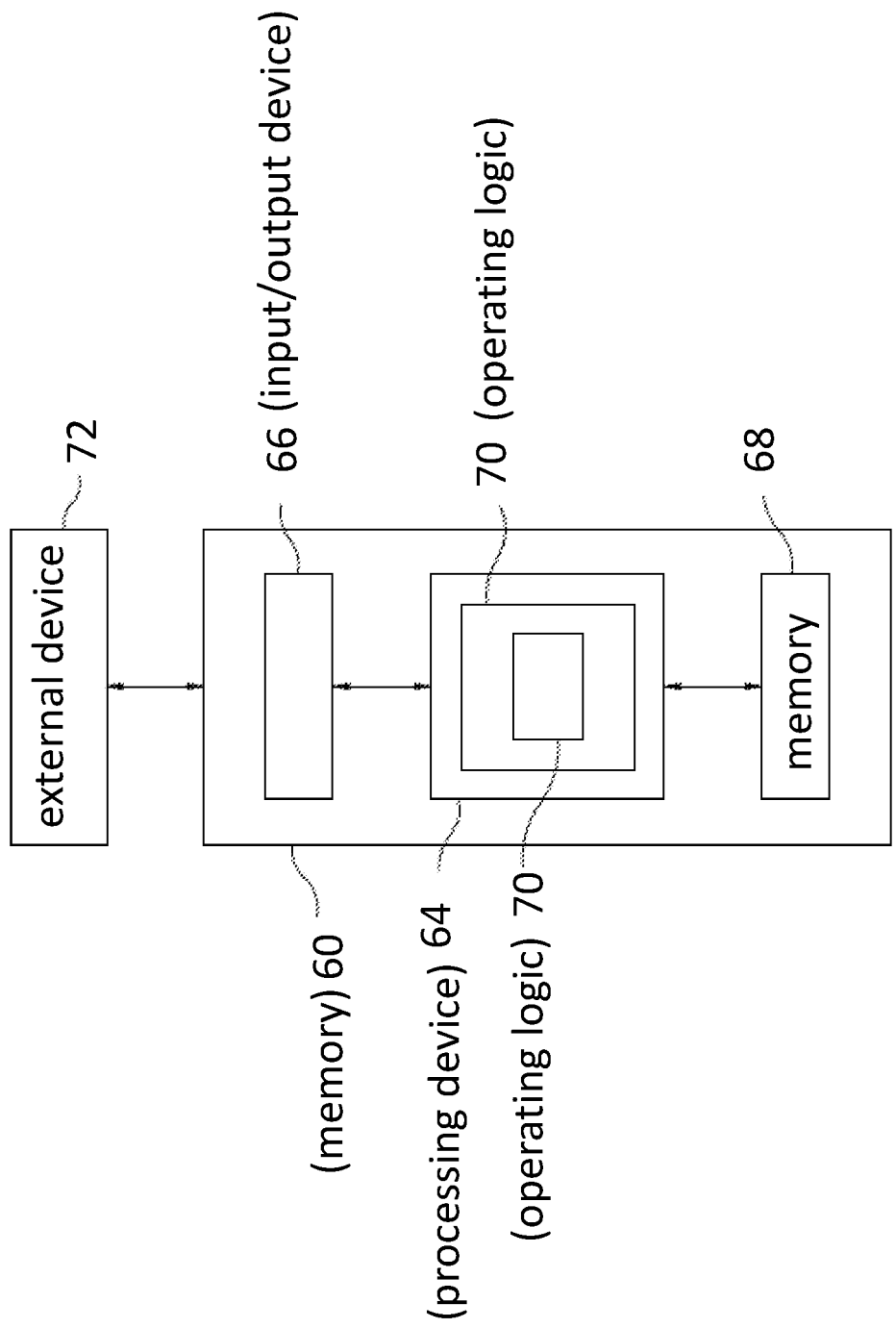
FIG. 2 depicts an embodiment of a controller useful to determine situational awareness of a robot.

The computer based application 62 referred to herein can be any type of useful computer program intended to determine position of object features within the scene taken by the camera 58, and also possibly develop control actions of the effector 56 and/or robot 54. The computer based application 62 can be executed using any variety of computing devices (e.g. desktop personal computer, a handheld device, etc), such as that shown in FIG. 2 in one non-limiting embodiment. FIG. 2 depicts a schematic diagram of a computer 60. Computer 60 includes a processing device 64, an input/output device 66, memory 68, and operating logic 70. Furthermore, computer 60 communicates with one or more external devices 72.

The input/output device 66 may be any type of device that allows the computer 60 to communicate with the external device 72. For example, the input/output device may be a network adapter, network card, or a port (e.g., a USB port, serial port, parallel port, VGA, DVI, HDMI, FireWire, CAT 5, or any other type of port). The input/output device 66 may be comprised of hardware, software, and/or firmware. It is contemplated that the input/output device 66 includes more than one of these adapters, cards, or ports.

The external device 72 may be any type of device that allows data to be inputted or outputted from the computer 60. In one non-limiting example the external device 72 is a hand held device. To set forth just a few non-limiting examples, the external device 72 may be another computer, a server, a printer, a display, an alarm, an illuminated indicator, a keyboard, a mouse, mouse button, or a touch screen display. Furthermore, it is contemplated that the external device 72 may be integrated into the computer 60. For example, the computer 60 may be a smartphone, a laptop computer, or a tablet computer in which case the display would be an external device 72, but the display is integrated with the computer 60 as one unit, which consistent with the general design of smartphones, laptop computers, tablet computers, and the like. It is further contemplated that there may be more than one external device in communication with the computer 60. The external device can be co-located with the computer 60 or alternatively located remotely from the computer.

Processing device 64 can be of a programmable type, a dedicated, hardwired state machine, or a combination of these; and can further include multiple processors, Arithmetic-Logic Units (ALUs), Central Processing Units (CPUs), or the like. For forms of processing device 64 with multiple processing units, distributed, pipelined, and/or parallel processing can be utilized as appropriate. Processing device 64 may be dedicated to performance of just the operations described herein or may be utilized in one or more additional applications. In the depicted form, processing device 64 is of a programmable variety that executes algorithms and processes data in accordance with operating logic 70 as defined by programming instructions (such as software or firmware) stored in memory 68. Alternatively or additionally, operating logic 70 for processing device 64 is at least partially defined by hardwired logic or other hardware. Processing device 64 can be comprised of one or more components of any type suitable to process the signals received from input/output device 66 or elsewhere, and provide desired output signals. Such components may include digital circuitry, analog circuitry, or a combination of both.

Memory 68 may be of one or more types, such as a solid-state variety, electromagnetic variety, optical variety, or a combination of these forms. Furthermore, memory 68 can be volatile, nonvolatile, or a mixture of these types, and some or all of memory 68 can be of a portable variety, such as a disk, tape, memory stick, cartridge, or the like. In addition, memory 68 can store data that is manipulated by the operating logic 70 of processing device 64, such as data representative of signals received from and/or sent to input/output device 66 in addition to or in lieu of storing programming instructions defining operating logic 70, just to name one example. As shown in FIG. 2, memory 68 may be included with processing device 64 and/or coupled to the processing device 64.

The operating logic 70 can include the algorithms and steps of the controller, whether the controller includes the entire suite of algorithms necessary to effect movement and actions of the robot 54, or whether the controller includes just those necessary to receive data from the camera 58, determine a point cloud, utilize object recognition (discussed further below), and resolve position of the objects relative to a frame of reference keyed to the robot 54. The operating logic can be saved in a memory device whether of the volatile or nonvolatile type, and can be expressed in any suitable type such as but not limited to source code, object code, and machine code.

Figure 3:
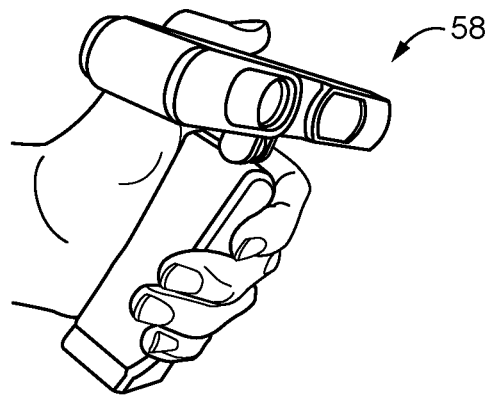
FIG. 3 depicts a camera used to capture a scene that includes a robot within a workspace.
Figure 3:
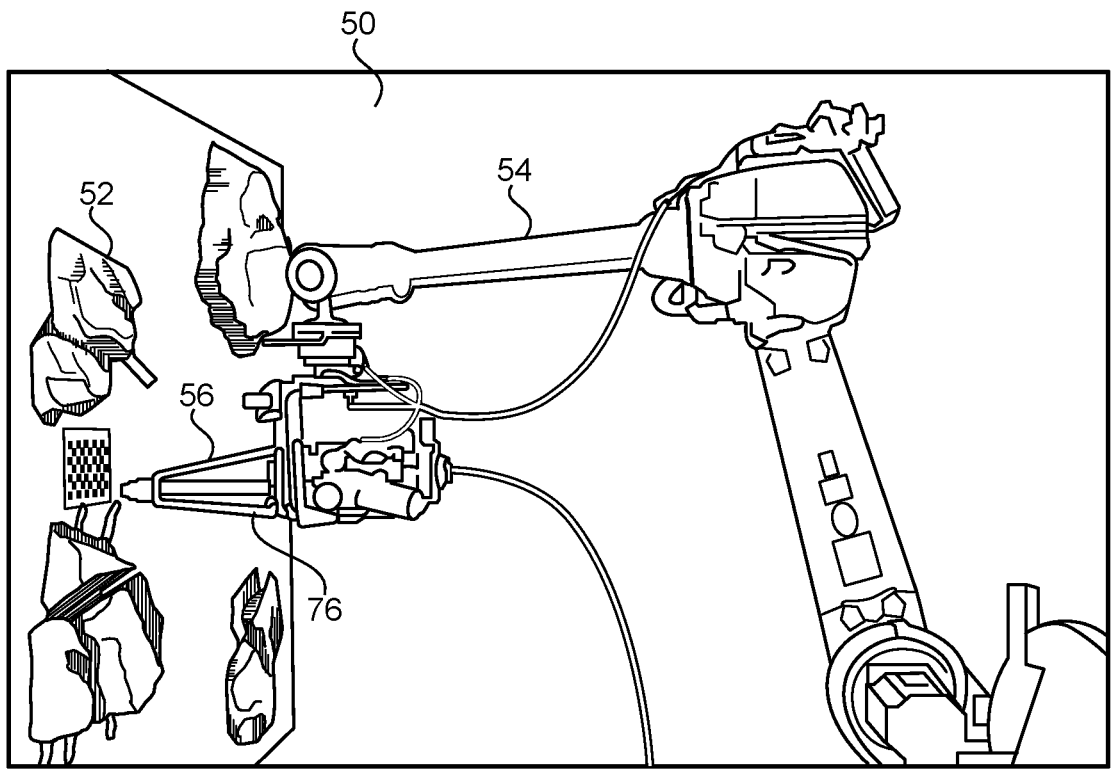
Figure 4:
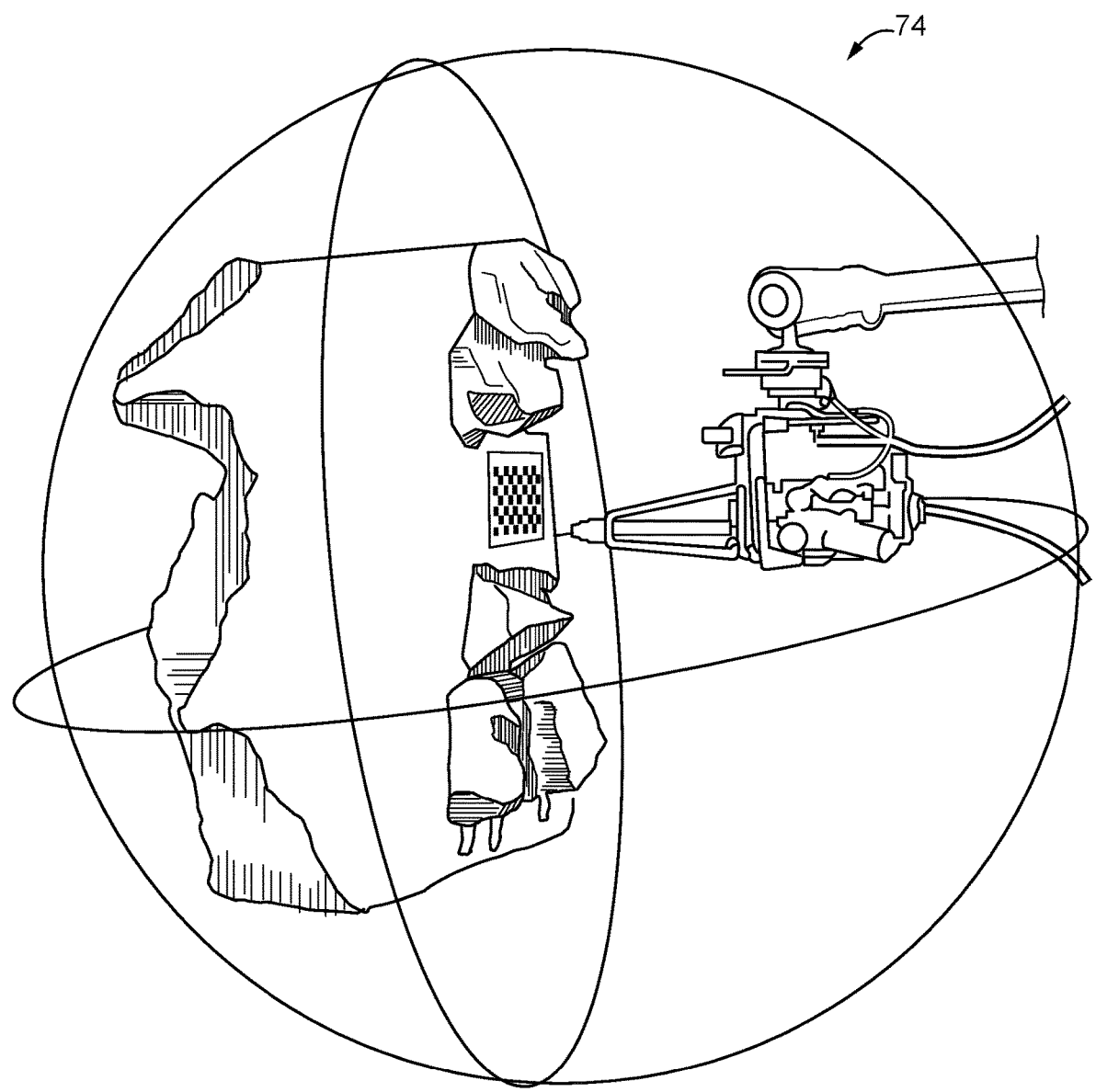
FIG. 4 depicts a computer generated image of the scene captured by the camera in FIG. 3.

Turning now to FIG. 3 and with continuing reference to FIG. 2, one embodiment of a workspace 50 is shown which includes a workspace object 52, robot 54, effector 56, and camera 58 used to scan the workspace 50. The illustration in FIG. 3 depicts use of the camera 58 to capture a scene which includes the various details of the workspace 50. Information received by the camera 58 is used by the computer 60, and specifically the controller or application 62 to form a point cloud, and from which position information can be determined. A computer based model 74 seen in FIG. 4 can be generated from the information captured by the camera 58. The computer based model 74 can include details of the scene captured by the camera 58, and can be expressed in any suitable data format.

To convert coordinate information of the point cloud captured by the camera (and thus expressed relative to a camera centric viewpoint) to coordinate information expressed relative to the robot, object recognition can be applied to the point cloud (or data derived from the point cloud), and specifically to a datum in the point cloud, where information about the datum is known relative to a frame of reference of the robot. Object recognition of the datum and subsequent coordinate conversion into a robot centric frame of reference can assist the robot in maintaining its situational awareness, performing navigation, and/or identifying potential movements that are free of obstruction, etc. It is contemplated that information about the datum such as its nature, size, shape, etc is known in advance by the embodiments described herein. Such prior knowledge can take the form of a computer based model of the datum such as, but not limited to, a CAD model, or derivations thereof. Such prior knowledge of the datum is useful in recognizing the datum using embodiments herein through the use of object recognition.

The datum can be any reference object in the workspace 50, and in some forms can be 2D or 3D. In one form the datum is the robot, or a portion of the robot, whether that portion includes one or more components. For example, a link 76 in a hand of the robot can be used as the datum so long as the object recognition techniques employed are capable of identifying the datum. Other examples of a datum include a tool used by the robot, or a base plate of the robot, to set forth just a few nonlimiting examples.

Object recognition algorithms used in any of the embodiments herein can derive from a number of separate approaches, including matching, learning, or pattern recognition. The object recognition used in the instant application can be applied directly to the point cloud data to determine the datum, or in some forms the point cloud data can be transformed and/or operated upon to form another data type prior to performing object recognition. For example, information about the CAD model, or information derived from the CAD model, can used to compare to the point cloud data generated from the camera (or alternatively derivations from the point cloud data generated from the camera). Such a CAD model can take any variety of forms which may or may not be transformed using any suitable technique to produce useable data for the object recognition. In one form the CAD model is a mesh model of the datum. To set forth just a few nonlimiting examples, object recognition can be applied from the point cloud data derived from the camera 58 to a point cloud data of the CAD model, or the point cloud data captured by the camera can be converted to another form (e.g. mesh) and object recognition can be application to a mesh model version of the CAD model. In short, the object recognition can be accomplished using the point cloud data captured by the camera, or any derivation from that data.

Until object recognition is performed, data from camera image provides point cloud information in camera space. Once the object is recognized, the position of objects in the workspace can be translated into robot space given information about the datum relative to the robot 54. For example, if the datum is a link on the robot, the position of the link relative to the robot will be known, and subsequent coordinate transformations of the point cloud data will also be known relative to the robot frame of reference so that position information can be provided to the robot about the objects 52, where such information is used to permit the robot to navigate and/or manipulate its surroundings.

Coordinate information from the camera perspective thus can be readily transformed to the robot perspective once the object recognition is completed. In one nonlimiting embodiment coordinate transformations will be understood to include transformations that involve rotation and/or translation from one origin and reference frame to another origin and reference frame. In some instances the origins and/or reference frame orientations can be similar, but in most instances will both be different. In sum, coordinates in the point cloud expressed relative to a camera centric viewpoint can be transformed to coordinates in the point cloud expressed relative to a robot centric viewpoint. Such transformation provides the robot with a situational awareness of the workspace object so that the robot can elect to interact or avoid the object.

One aspect of the present application provides an apparatus comprising a workspace having a workspace object and a robot object, a position finder structured to receive a position information signal from the workspace, a computing device structured to store instructions and process information related to a location of the robot object within the workspace, and a computer based application hosted on the computing device and configured to develop a point cloud based on the position information signal received from the position finder, utilize object recognition to detect a datum in the position information signal received from the position finder, and identify particular points in the point cloud as a result of the object recognition to provide localized position information about the robot relative to the workspace object.

A feature of the present application includes wherein the computer based application is configured to transform coordinates of points in the point cloud associated with the workspace object to a robot centric reference frame.

Another feature of the present application includes wherein the datum is at least a portion of the robot object, and wherein the position finder is a camera.

Still another feature of the present application includes wherein the camera is not mounted on the robot.

Yet another feature of the present application includes wherein the object recognition is determined by comparing information from the point cloud to information stored about the datum.

Still yet another feature of the present application includes wherein the datum is at least a portion of the robot object.

Yet still another feature of the present application includes wherein the information stored about the datum relates to a CAD model of the datum.

A further feature of the present application includes wherein the position finder is one of a camera and a scanner, and the position information signal is reflected electromagnetic radiation.

A still further feature of the present application includes wherein the position finder is a 3D camera.

A yet still further feature of the present application includes a scanner system that includes the position finder.

Another aspect of the present application includes an apparatus comprising a robot localization controller configured to determine spatial location of a robot within a robotic cell relative to a workspace object in the robotic cell, the robot localization controller structured to: receive position data from a position finder, form a point cloud from the position data, identify a datum in the point cloud through use of object recognition, and determine a position of the robot relative to the workspace object through use of information generated as a result of identifying the datum in the point cloud through object recognition.

A feature of the present application includes wherein the datum is at least a portion of the robot.

Another feature of the present application includes wherein the position finder is a camera.

Still another feature of the present application includes wherein image data from the camera is in the form of data points generated from a laser scan.

Yet another feature of the present application includes wherein the robot localization controller is structured to transform the datum from a camera centric reference frame to a robot centric reference frame.

Still yet another feature of the present application includes wherein the object recognition utilizes predetermined information about the datum.

Yet still another feature of the present application includes wherein the predetermined information is generated from a CAD model of the datum.

A further feature of the present application includes wherein the camera is one of a scanner and a 3D camera.

Yet another aspect of the present application includes a method comprising: capturing an image of a robotic workspace, the workspace including a robot object and a workplace object, determining a point cloud based upon the captured image, detecting a datum within the captured image based upon object recognition, and localizing the robot object in the workspace based upon the point cloud and the object recognition.

A feature of the present application includes wherein the localizing the robot object includes formulating position information of the object relative to the robot object.

Another feature of the present application further includes transforming position information of the datum from a camera spatial orientation to a robot object spatial orientation such that a robot can maneuver in regard to the position of the object.

Still another feature of the present application includes wherein the datum is at least a portion of the robot object.

Yet another feature of the present application further includes ceasing movement of the robot object during the capturing.

Still yet another feature of the present application includes wherein the capturing includes at least one of laser scanning, 3-D image capturing, or successive 2-D camera capturing.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An apparatus comprising:
  a workspace having a workspace object and a robot object, the workspace object separate from the robot object such that relative motion occurs between the workspace object and the robot object when a robot having the robot object is in motion;
  a position finder structured to receive a position information signal from the workspace;
  a computing device structured to store instructions and process information related to a location of the robot object within the workspace; and
  a computer based application hosted on the computing device and configured to develop a point cloud centric to the position finder based on the position information signal received from the position finder when the workspace object is separate from the robot object such that the robot object is capable of moving without corresponding movement from the workspace object, apply object recognition to the position information signal obtained from the point cloud to detect a datum in the position information signal received from the position finder, and apply coordinate transformation using the datum to identify and convert particular points in the point cloud as a result of the object recognition to provide localized position information centric to the robot relative to the workspace object when the workspace object is separate from the robot object such that the robot object is capable of moving independent from the workspace object when the workspace object is not engaged with the robot object and where the workspace object moves with the robot object when the workspace object is engaged with the robot object;
  wherein the datum is separate from the robot object and the workspace object such that the robot object and the workspace object move independent of the datum when the workspace object is engaged with the robot object.

2. The apparatus of claim 1, wherein the computer based application is configured to transform coordinates of points in the point cloud associated with the workspace object to a robot centric reference frame.

3. The apparatus of claim 2, wherein the position finder is a camera.

4. The apparatus of claim 3, wherein the camera is not mounted on the robot.

5. The apparatus of claim 1, wherein the object recognition is determined by comparing information from the point cloud to information stored about the datum.

6. The apparatus of claim 5, wherein the information stored about the datum relates to a CAD model of the datum.

7. The apparatus of claim 1, wherein the position finder is one of a camera and a scanner, and the position information signal is reflected electromagnetic radiation.

8. The apparatus of claim 7, wherein the position finder is a 3D camera.

9. The apparatus of claim 7, which further includes a scanner system that includes the position finder.

10. An apparatus comprising:
a robot localization controller configured to determine spatial location of a robot within a robotic cell relative to a workspace object in the robotic cell, the robot being apart from the workspace object and configured to be movable relative to the workspace object, the robot localization controller structured to:
receive position data from a position finder;
form a point cloud centric to the position finder from the position data when the workspace object is apart from the robot;
identify a datum in the point cloud through use of object recognition applied to the position information signal obtained from the point cloud, the datum being apart from the robot such that the robot is configured to be movable relative to the datum;
and apply coordinate transformation using the datum to identify and convert particular points in the point cloud to determine a position of the robot relative to the workspace object when the workspace object is apart from the robot through use of information generated as a result of identifying the datum in the point cloud through object recognition,
wherein the robot is capable of moving independently of the workspace object when the workspace object is not engaged with the robot and wherein the workspace object moves with the robot when the workspace object is engaged with the robot, and wherein the robot and the workspace object move independently of the datum when the workspace object is engaged with the robot.

11. The apparatus of claim 10, wherein the position finder is a camera.

12. The apparatus of claim 11, wherein image data from the camera is in the form of data points generated from a laser scan.

13. The apparatus of claim 10, wherein the robot localization controller is structured to transform the datum from a camera centric reference frame to a robot centric reference frame.

14. The apparatus of claim 13, wherein the object recognition utilizes predetermined information about the datum.

15. The apparatus of claim 14, wherein the predetermined information is generated from a CAD model of the datum.

16. The apparatus of claim 15, wherein the position finder is one of a scanner and a 3D camera.

17. A method comprising:
moving a robot having a robot object relative to a workspace object;
capturing an image of a robotic workspace with a position finder, the robotic workspace including the robot object and the workspace object where the robot is structured to be movable relative to the workspace object, the captured image formed when the workspace object is not coupled with the robot object such that the robot object moves relative to the workspace object;
determining a point cloud centric to the position finder based upon the captured image;
detecting a datum within the captured image based upon object recognition applied to the point cloud, wherein the datum is not coupled with the robot such that the robot is capable of moving without corresponding movement from the datum; and
applying coordinate transformation using the datum to convert particular points in the point cloud to localize the robot object in the workspace based upon the point cloud and the object recognition,
wherein the robot object is capable of moving independent of the workspace object when the workspace object is not engaged with the robot having the robot object and wherein the workspace object moves with the robot object when the workspace object is engaged with the robot having the robot object, and wherein the robot object and the workspace object move independent of the datum when the workspace object is engaged with the robot having the robot object.

18. The method of claim 17, wherein the localizing the robot object includes formulating position information of the object relative to the robot object.

19. The method of claim 18, which further includes transforming position information of the datum from a camera spatial orientation to a robot object spatial orientation such that a robot can maneuver in regard to the position of the object.

20. The method of claim 19, which further includes ceasing movement of the robot object during the capturing.

21. The method of claim 20, wherein the capturing includes at least one of laser scanning, 3-D image capturing, or successive 2-D camera capturing.

* * * * *